(12) United States Patent
Neal et al.

(10) Patent No.: US 8,335,616 B2
(45) Date of Patent: Dec. 18, 2012

(54) INDIVIDUALIZABLE POST-CRASH ASSIST SYSTEM

(75) Inventors: Mark O. Neal, Rochester, MI (US);
Nataraju Vusirikala, Vizianagaram (IN); Jenne-Tai Wang, Rochester, MI (US); Abir Chakraborty, Bangalore (IN)

(73) Assignee: GM Global Technology Operations LLC

( * ) Notice: Subject to any disclaimer, the term of this patent is extended or adjusted under 35 U.S.C. 154(b) by 120 days.

(21) Appl. No.: 12/890,863

(22) Filed: Sep. 27, 2010

(65) Prior Publication Data

US 2012/0078472 A1    Mar. 29, 2012

(51) Int. Cl.
*B60R 22/00* (2006.01)

(52) U.S. Cl. ............ 701/45; 701/36; 340/438; 180/271; 280/734

(58) Field of Classification Search ............. 701/36, 701/45, 49, 301; 340/425.5, 438, 439; 180/268, 180/271, 273; 280/734, 735
See application file for complete search history.

(56) References Cited

U.S. PATENT DOCUMENTS

| | | | |
|---|---|---|---|
| 6,448,890 B1* | 9/2002 | Cooper | 340/438 |
| 6,598,900 B2* | 7/2003 | Stanley et al. | 280/735 |
| 7,164,117 B2* | 1/2007 | Breed et al. | 250/221 |
| 7,236,865 B2* | 6/2007 | Prakah-Asante et al. | 701/45 |
| 7,770,920 B2* | 8/2010 | Breed et al. | 280/735 |
| 2005/0090955 A1* | 4/2005 | Engelman et al. | 701/36 |

* cited by examiner

*Primary Examiner* — Gertrude Arthur Jeanglaude

(57) ABSTRACT

A method for predicting potential injury assessment for at least one occupant of a vehicle involved in a crash event and for broadcasting assessment of the occupant to a medical response unit. An occupant seated in each seat of a vehicle is detected. Occupant data is obtained relating to physical characteristics of each occupant seated in the vehicle. A crash event involving the vehicle is detected. Vehicle dynamic data and safety restraint data during the crash event is recorded. The potential injury assessment of each occupant is predicted by an injury assessment processing module based on the vehicle dynamic data and safety restraint data obtained during the crash event and the occupant data of each occupant in the vehicle. The corresponding injury assessment of each occupant of the vehicle is broadcast to a medical response unit.

22 Claims, 3 Drawing Sheets

INDIVIDUALIZABLE POST-CRASH ASSIST SYSTEM

BACKGROUND OF INVENTION

An embodiment relates generally to a vehicular post crash notification system.

Vehicle systems are equipped with sensors to detect when a vehicle accident such as a crash occurs. Such sensors may include impact sensors which are used to deploy air bag systems and other safety restraint devices. Upon the detection of a crash by a vehicle sensor or deployment of air bags, vehicles have incorporated in-vehicle security services which utilize wireless communication so that an accident may be communicated to a remote base for medical assistance. In response to the notification of the impact or deployment of safety devices, the remote base can contact a medical response unit such as an ambulance to assist at the crash scene. The details of the accident, however, may be unknown and the only information that can be conveyed to the medical response unit is the status of the safety devices (e.g., air bag deployed). Therefore, limited information is provided to the medical response unit if a person involved in the accident or witnessing the accident does not convey detailed information regarding the accident to the remote base. As a result, the medical response unit does not know the severity of the injuries that may have occurred to those in the accident.

SUMMARY OF INVENTION

An advantage of an embodiment is an injury assessment of potential injuries to each occupant of a vehicle involved in a crash and the transmittal of the injury assessment information to a medical response unit. The injury assessment is determined using a statistical-based approach or a simulation-based approach utilizing vehicle sensor crash data, occupant physical characteristic data, vehicle seat position data, and vehicle dynamic data before and after the crash for assessing a potential risk of injury to each occupant. Assessing the potential injuries to each occupant provides advanced warning to the medical response unit so that potential injuries may be known prior to the medical response unit's arrival to treat each occupant. Such advanced warning of potential injuries allows the medical response unit to form a plan as to how each occupant will be evaluated and treated.

An embodiment contemplates a method for predicting potential injury assessments for occupants of a vehicle involved in a crash event and for broadcasting assessment of each occupant to a medical response unit. An occupant seated in each seat of a vehicle is detected. Occupant data relating to physical characteristics of each occupant seated in the vehicle is obtained. The crash event involving the vehicle is detected. Vehicle dynamic data and safety restraint data are recorded during the crash event. The potential injuries assessment of each occupant is predicted by a injury assessment processing module based on the vehicle dynamic data and safety restraint data obtained during the crash event and the occupant data of each occupant in the vehicle. The injury assessment processing module outputs the injury assessment of each occupant for evaluation by a medical response unit. The corresponding injury assessment of each occupant of the vehicle is broadcast to a medical response unit.

An embodiment contemplates an automated injury assessment prediction system for a crash event. A plurality of sensors is provided for obtaining vehicle dynamic data and safety restraint data relating to a crash event. An electronic control unit receives the vehicle dynamic data and the safety related data from the plurality of sensors. An injury assessment processing module is in communication with the electrical control unit. The injury assessment processing module predicts a potential injury assessment for each occupant of the vehicle as a result of the crash event. An input device inputs occupant data to the injury assessment processing module. The occupant data relates to physical characteristics of each occupant seated in the vehicle. A communication device notifies a medical response unit of the crash event and broadcasts the predicted potential injuries of each occupant to a medical response unit. The injury assessment processing module predicts the potential injuries of each occupant based on the vehicle dynamic data, the safety restraint data, and the occupant data of each occupant in the vehicle

DETAILED DESCRIPTION

Figure 1:
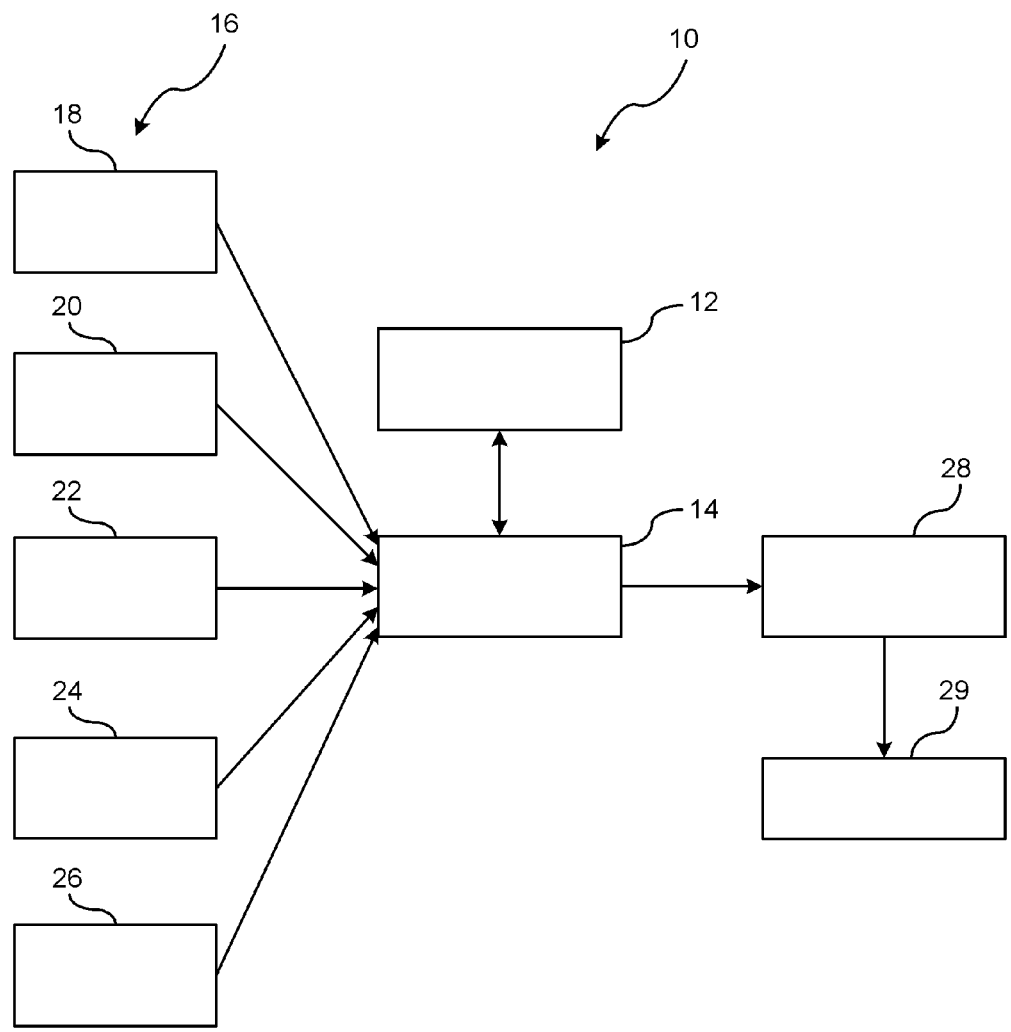
FIG. 1 is a block diagram of an automated injury assessment prediction system.

Referring to FIG. 1, an automated injury assessment prediction system 10 is shown for determining an injury assessment of one or more occupants involved a vehicle crash event. The automatic injury assessment prediction system 10 determines an injury assessment of each occupant utilizing a statistical-based approach or a simulation-based approach. The automated injury assessment prediction system 10 includes a user interface 12, an electronic control unit 14, and a plurality of sensing devices 16 disposed within a vehicle.

The electronic control unit 14 may include one or more controllers that cooperatively collect and process data received by the plurality of sensing devices 16. The vehicle includes a plurality of seats in which occupants disposed within the vehicle are seated and are secured by one or more safety restraint devices.

The plurality of sensors include, but are not limited to, air bag module deployment sensing devices 18, seat position sensing devices 20, safety restraint devices 22 (e.g., safety belts), and vehicle dynamic sensing devices 24.

The air bag module deployment sensing devices 18 include sensors that provide information relating to an airbag status, airbag deployment time, a second stage delay time, an airbag vent size, an airbag vent opening time, and airbag tether lengths.

The seat position sensing devices 20 include, but are not limited to, sensors that provide seat position such as a fore-aft position of the seat, a vertical position of the seat, and a hip joint position of the vehicle seat. The various seating positions provide details as to a proximal relationship between the occupant seated in a vehicle seat and the interior enclosures surrounding the occupant for analyzing how the occupant's body may react during a crash event.

The safety restraint devices 22 include, but are not limited to, sensors that provide seat belt buckle status, belt payout at crash initiation, belt payout time history, a load limit when belt payouts initiate, load limits at each stage of a belt payout, and pre-tensioner deployment times.

The vehicle dynamic sensing devices 24 include, but are not limited to, sensors that provide changes in velocity, wheel slip conditions, braking forces, crash modes, rollover status, and 3-D acceleration pulses.

Other information such as the vehicle identification, vehicle mass, and safety equipment may be previously stored in a memory of the ECU or other memory and recalled when needed.

The user input device 12 allows a user to enter occupant data relating to a physical characteristics of each occupant seated in a respective vehicle. Occupant data includes, but is not limited to, an occupant's body mass (e.g., weight), height, gender, age, and medical information. Medical information may include any medical condition or information which could further impact a risk of injury to an occupant during a collision or may be a medical condition that is pertinent to a medical response unit when attending to the aide of an occupant involved in the crash. Preferably, the user will only be required to enter the information one time for a respective occupant which will be maintained and stored for the respective occupant. This may be performed at any time, such as the time when a user purchases a vehicle or on an ongoing basis when new occupants enter the vehicle. Thereafter, the user can enter an identifier that associates the respective occupant with the stored occupant data so that information does not need to be repetitiously entered by the user. Alternatively, each user may carry an identification tag or radio frequency identification tag (RFID) that can be manually or automatically scanned to obtain the unique identifier of the occupant seated in the vehicle seat or occupant data stored on the identification tag may be automatically uploaded. In addition, if occupants of a vehicle typically have a same seating position, the user input device 12 can accept a group identification code which identifies each occupant of the group (e.g., a family) and associates each occupant to a respective vehicle seat that each occupant is customarily seated.

The automated injury assessment prediction system 10 may further include an occupant detection system 26 that automatically obtains data relating to physical characteristics of person seated in a respective vehicle seat. For example, if a person is detected in a vehicle seat but that occupant is unidentified (e.g., one in which no data is either input or stored), then the occupant detection system can utilize vehicle based devices (e.g., weight sensors) to obtain physical characteristic data relating to the unidentified occupant and provide a standard physical characteristic data for the occupant to the injury assessment processing module. The occupant detection system 26 may also include imaging devices that may automatically analyze images and determine detailed information about the occupant such as gender and height. Such information may be used to determine physical characteristics for an unidentified occupant or may be used to verify an identified occupant. Alternatively, the data obtained by the automated injury assessment prediction system 10 may be used to re-verify an identified occupant. For example, if an identification is obtained for a seated occupant in the vehicle, the occupant detection system 26 can utilize the vehicle based devices to re-verify the identified occupant.

The electronic control unit 14 is coupled to the user interface device 12 and the plurality of sensors 16 for processing the received information. The electronic control unit 14 is in communication with an injury assessment processing module 28. Preferably, the injury assessment processing module 28 is a module remote from the vehicle. An advantage of having the injury assessment processing module 28 remote from the vehicle is that vehicle may be limited by the number of processors, the processing power, and the amount of memory that is required to run the statistical or simulation routines. The medical assessment routine for assessing each occupant of the vehicle after a crash event may be implemented by utilizing a subscription-based communication service, such as OnStar®, that is currently provided by vehicle manufacturers on vehicles. This service is used to provide in-vehicle security, remote diagnostics systems, and turn-by-turn navigation through a wireless communication system. Remote services, such as Onstar®, have sufficient computing devices with processing power capability and large memory storage capability to execute statistical and simulation routines of the system 10. In utilizing a remote system in comparison to an in-vehicle based system, additional hardware and software that would otherwise be required for in each vehicle for a vehicle-based system is eliminated.

The injury assessment processing module 28 analyzes the data provided by the electronic control unit 14 and predicts a injury assessment for each occupant of the vehicle involved in the crash utilizing a statistical-based routine and/or simulation-based routine. The term injury assessment is defined as a predicted injury that may occur to any occupant of the vehicle based on the data obtained before, during, and after the crash event. The injury assessment is then communicated to a medical response unit so that the medical response unit can be aware of the potential injuries to the occupants of the vehicle and can immediately focus on the predicted injuries upon examining each occupant, and can obtain any specialized equipment or supplies before responding to the scene of the accident.

Figure 2:
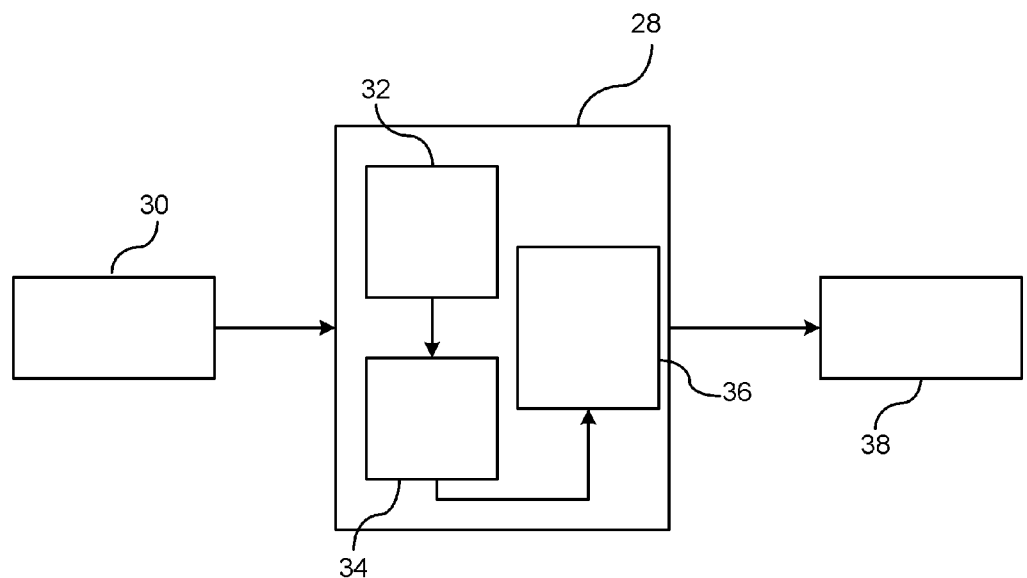
FIG. 2 is a block diagram of a statistical-based approach for determining an injury assessment.

FIG. 2 illustrates a block diagram utilizing a statistical-based approach. Vehicle crash data 30 obtained by the plurality of sensors of the vehicle in addition to the occupant data is provided to the injury assessment processing module 28 for analysis. The injury assessment processing module 28 also utilizes statistical field crash/injury data 32 obtained from reporting systems that include, but are not limited to, fatality analysis reporting system (FARS), crash injury research engineering network (CIREN), and the National Accident Sampling System (NASS). FARS is a system that provides a measurable of highway safety events to evaluate the effectiveness of motor vehicle safety standards and highway safety programs. The data obtained from FARS assists in understanding the characteristics of the environment, traffic flow, vehicles, and persons involved in the crash.

CIREN is a database that contains medical and crash data of severely injured occupants involved in motor vehicle crashes. The National Accident Sampling System (NASS) is a nationwide accident data collection system that provides automated and comprehensive traffic accident data. NASS data is generated in two subsystems, the General Estimates System (GES) that collects data on a sample of police traffic crash reports, and the Crashworthiness Data System that collects additional detailed information on a sample of police reported traffic crashes.

Vehicle crash data 30 obtained from the plurality of sensors and occupant data input to the injury assessment processing module in cooperation with the statistical field crash/injury data 32 is analyzed in block 34. In block 34, all of the data input to block 34 is analyzed based on the vehicle type, crash severity, and vehicle dynamics at the time of the crash in addition to other dynamic and static criteria. The data may be analyzed by the following that includes, but is not limited to, regression analysis, artificial neural networks, or a root square mean method.

Block 36 illustrates a probability assessment map generated by the injury assessment processing module. The injury probability map includes a statistical output of the potential injuries of an occupant. For example, the injury probability map may include a table identifying one or more human anatomy parts that include, but are not limited to, an organ, bone, tissue, or blood vessels. In addition, the table may provide a percentage identifying a potential injury occurring to a respective anatomy part of the occupant as a result of the collision event. Alternatively, the injury probability map may include a pictorial of a human body, human skeleton, or skeleton with mass identifying a potential injury occurring as a result of the crash. The potential injury may be identified by highlighting the respective anatomy part and/or providing a percentage of the risk of injury to the respective anatomy part. The two respective probability maps as described herein are only a few of the examples of how the generated information may be generated and output from the injury assessment processing module.

In block 38, the corresponding injury assessment information is provided to a medical response unit. The injury assessment information may be conveyed to the injury response unit in the formats previously described (e.g., tables or human anatomy figures). Alternatively, the injury assessment information may be conveyed to the medical response unit audibly, such as personnel from the monitoring service (e.g., OnStar®) providing verbal communication of the injury assessment information to the medical response unit.

Figure 3:
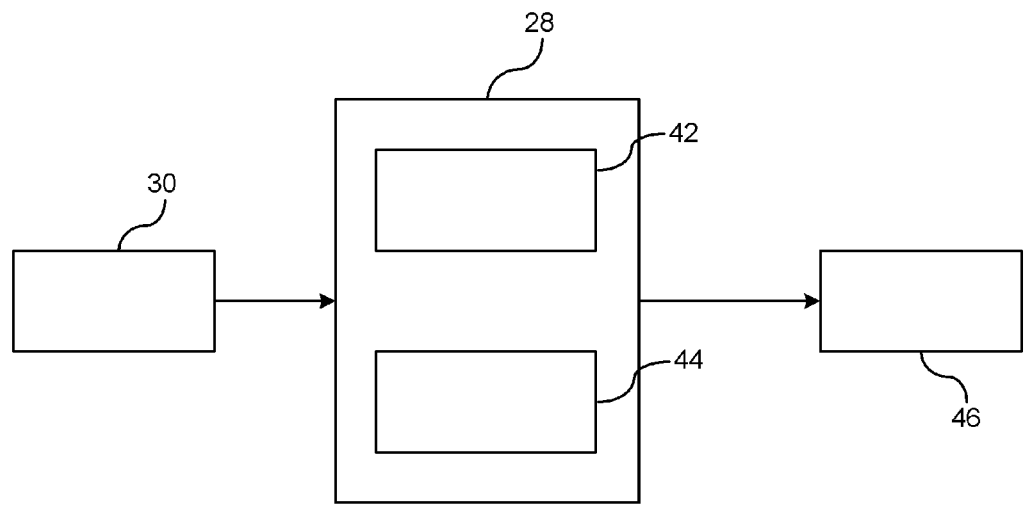
FIG. 3 is a block diagram of a simulation-based approach for determining a injury assessment

FIG. 3 illustrates a block diagram utilizing a simulation-based approach. The data 30 obtained by the plurality of sensors of the vehicle in addition to the occupant data is provided to the injury assessment processing module 28 for analysis. The injury assessment processing module 28 utilizes a simulation program to predict the injuries to each occupant of the vehicle. Simulation of the crash as it relates to each of the occupants can be executed utilizing either of two techniques, specifically, a simulation-matching a simulation response surface approach 42 or an exclusive simulation approach 44.

Under the simulation response surface approach 42, a large number of crash simulations are performed ahead of time with a range of different values for occupant characteristics, seating positions, and vehicle crash data. A response surface is then generated based on the occupant injuries predicted by these simulations that gives an estimate of the occupant injuries as a function of the occupant characteristics, seating positions, and vehicle crash data. This provides an initial assessment that can be provided to the medical response unit 46 in a very minimal time frame after the occurrence of the crash event.

Under the exclusive simulation approach 44, a simulation model is generated based on the occupant data and the data obtained from the plurality of sensors. This approach provides a more accurate result since the model is being generated specifically for the respective crash event. The exclusive simulation approach 44 is computationally intensive which takes a longer time period to generate the results. Such results may be provided to the medical response unit 46 such as an ambulance that is enroute to the accident and/or may be provided to a medical facility such as an emergency unit at a hospital. The outputs from the exclusive simulation approach 44 can be conveyed to the medical response unit by display (e.g, paper, electronic, video) or audibly as describe earlier.

The statistical approach, simulation response surface, or the exclusive simulation approach may be executed individually or in combination with one another after a crash event is detected and reported to the injury assessment processing module. For example, the statistical-based approach may be used to provide an initial assessment of the injuries to each occupant of the vehicle that is initially provided to a medical response unit. Thereafter, a more detailed assessment of the injuries to each occupant may be generated by the simulation-based approach which takes additional time to generate but may provide a more detailed or accurate assessment. Alternatively, weighted averages may be provided to the injury assessment of each approach and a combined output of the injury assessment may be provided to the medical response unit.

Figure 4:
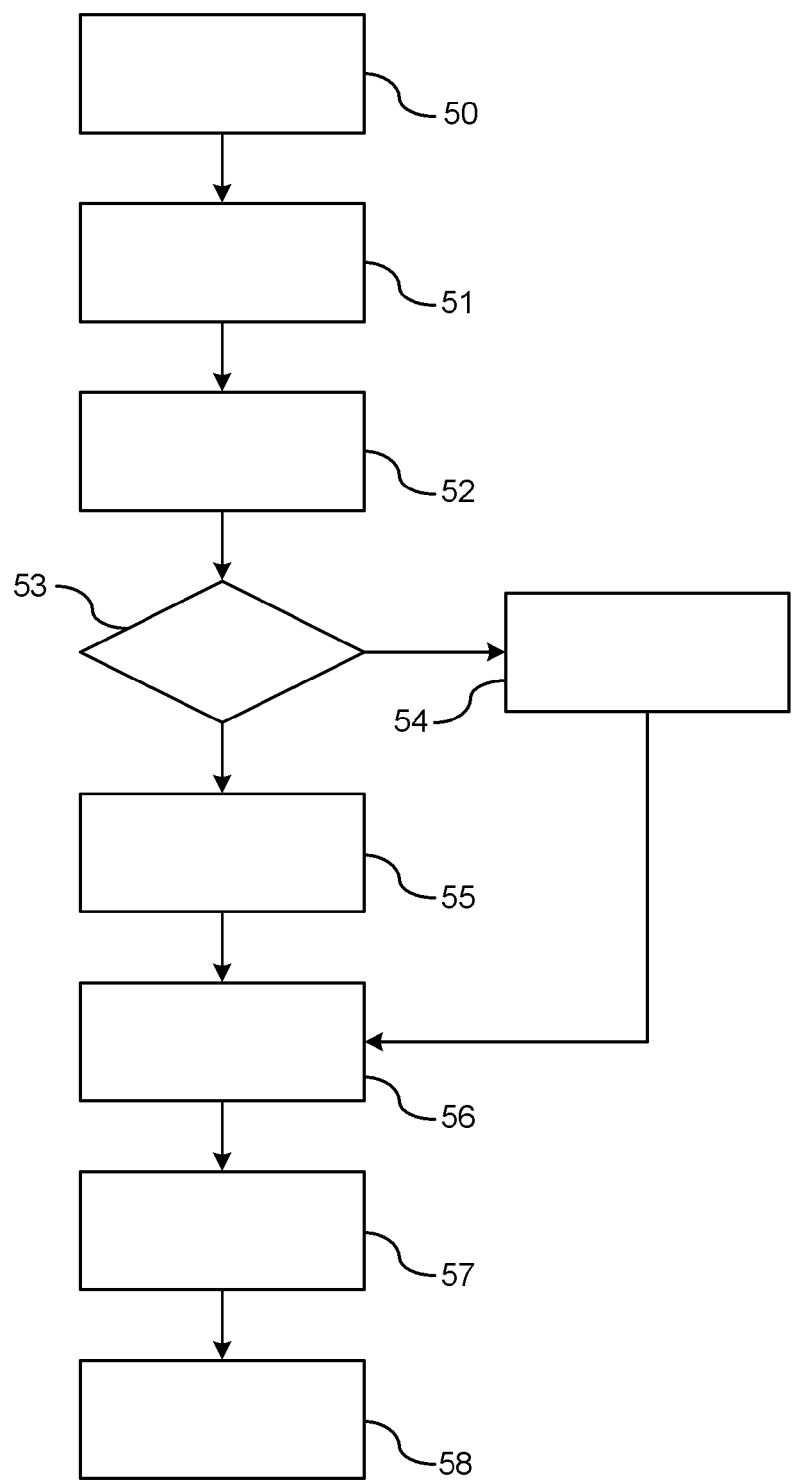
FIG. 4 is a flowchart of a method for predicting the risk of injury to each occupant of a vehicle.

FIG. 4 is a flowchart of a method for assessing the risk of injury to each occupant of a vehicle and for providing an injury assessment of the risk of injury to a medical response unit. In step 50, occupant data for each occupant is uploaded to an injury assessment processing module. Occupant data, as described earlier, may be uploaded by a single user, or individual occupants. Moreover, identification cards carried by each occupant may be automatically read to determine the occupant and the associated characteristics.

In step 51, the vehicle ignition is turned to the on position. In step 52, a vehicle system detects whether a person is seated in a vehicle seat. Detection of the occupant in a vehicle seat may be detected by various methods which include, but are not limited to, latching of the seat belt switch, occupant weight sensors in the seat, imaging devices, and signal emitting devices (e.g., RF, microwave).

In step 53, a determination is made whether the occupant detected in a vehicle seat is an identified occupant. An identified occupant is defined as person for which occupant data is either input by the user or is identified in some manner so that stored occupant data associated with the occupant is stored. If a determination is made that the detected person in the vehicle seat is an unverified occupant (e.g., in the sense that an identity of the occupant cannot be obtained), then the system selects standard occupant data for the unverified occupant in step 54. Any physical characteristics of the unidentified occupant that have been obtained by any of the sensing devices may be used to further refine the selection of the standard occupant data to be used for post crash analysis of the respective unidentified occupant.

If a determination is made that the person detected in the vehicle seat is a verified occupant for which associated occupant data is available, then the respective occupant data associated with the occupant seated in the vehicle seat is retrieved upon detection of the crash event for post crash analysis in step 55.

In step 56, a crash event is detected and notification is provided to the injury assessment processing module. The electronic control module notifies the injury assessment processing module of the crash event. The electronic control unit also provides to the injury assessment processing module data relating to the vehicle dynamic data (e.g., before and after the crash), safety restraint data that includes occupant position data, and crash information data obtained by the plurality of sensors of the vehicle.

In step 57, the system predicts the injury assessment (e.g., injury assessment) of each occupant of the vehicle utilizing the occupant data associated with the occupant as determined in steps 54 and 55. The injury assessment processing module determines the injury assessment utilizing the statistical technique or the simulation technique. Alternatively, the injury assessment processing module may initially generate a statistical assessment of the crash event to provide an initial assessment of each occupant that is less detailed than the simulation technique, and later followed by a more detailed assessment as generated by the simulation technique which requires more processing time in contrast to the statistical approach.

In step 58, the injury assessment of each occupant of the vehicle is broadcast to a medical response unit. The medical service provider may be an ambulance enroute to the crash event and/or may a medical facility such as a hospital. The injury assessment of each occupant provides advanced diagnosis of potential injuries so that the medical response unit can quickly focus on what requires immediate attention as opposed to performing an initial and uninformed examination of each occupant.

While certain embodiments of the present invention have been described in detail, those familiar with the art to which this invention relates will recognize various alternative designs and embodiments for practicing the invention as defined by the following claims.

What is claimed is:

1. A method for predicting potential injury assessments for occupants of a vehicle involved in a crash event and for broadcasting assessment of each occupant to a medical response unit, the method comprising the steps of:
   detecting an occupant seated in each seat of a vehicle;
   obtaining occupant data relating to physical characteristics of each occupant seated in the vehicle;
   detecting the crash event involving the vehicle;
   recording vehicle dynamic data and safety restraint data during the crash event;
   predicting the potential injuries assessment of each occupant by an injury assessment processing module based on the vehicle dynamic data and safety restraint data obtained during the crash event and the occupant data of each occupant in the vehicle, the injury assessment processing module outputting the injury assessment of each occupant for evaluation by a medical response unit; and
   broadcasting the corresponding injury assessment of each occupant of the vehicle to a medical response unit.

2. The method of claim 1 wherein the injury assessment processing module is remote from the vehicle, wherein the vehicle dynamic data, the safety restraint data, and the occupant data are wirelessly transmitted to the injury assessment processing module for performing the potential injury assessment for each occupant of the vehicle.

3. The method of claim 1 wherein a user pre-uploads to the injury assessment processing module occupant data relating to a respective occupant.

4. The method of claim 1 wherein the occupant data is pre-loaded to the injury assessment processing module, wherein a respective identifier associated with a respective occupant is uploaded to the injury assessment processing module for identifying the respective occupant, wherein the injury assessment processing module associates the occupant data with the respective occupant based on the associated identifier.

5. The method of claim 4 wherein an occupant detection system re-verifies an identity of the respective identified occupant seated in a vehicle seat.

6. The method of claim 1 wherein an occupant detection system automatically obtains physical characteristic data of an unidentified occupant seated in a respective vehicle seat for generating occupant data for the unidentified occupant.

7. The method of claim 1 wherein the injury assessment processing module predicts an injury assessment for each occupant of the vehicle utilizing a statistical based approach, wherein the statistical based approach utilizes historical crash data and analyzes the injury risk of each occupant in cooperation with the vehicle dynamic data, safety restraint data, and occupant data.

8. The method of claim 1 wherein the injury assessment processing module predicts the potential injury assessment of each occupant of the vehicle utilizing a simulation based approach, wherein the simulation based approach utilizes a computer model to simulate the crash event, and predict the potential injury assessment of each occupant in cooperation with the obtained vehicle dynamic data, safety restraint data, and occupant data.

9. The method of claim 8 wherein the simulation based approach utilizes previous simulations to determine the injury assessment of each occupant of the vehicle.

10. The method of claim 1 wherein the simulation based approach executes a simulation of the crash event utilizing the obtained vehicle dynamic data, safety restraint data, and occupant data of the crash event.

11. The method of claim 1 wherein the injury assessment probability module outputs an injury probability assessment map, wherein broadcasting the corresponding assessment information for each occupant of the vehicle to a medical response unit includes providing the injury probability assessment map to the medical response unit.

12. The method of claim 1 wherein the injury assessment probability module predicts an injury assessment for each occupant of the vehicle utilizing a statistical-based approach and a simulation based approach, wherein the statistical based approach is utilized as an initial assessment followed by a comprehensive assessment provided by the simulation based approach.

13. The method of claim 1 wherein the injury assessment probability module predicts an injury assessment for each occupant of the vehicle utilizing a statistical-based approach and a simulation based approach, wherein weighted averages are applied to the injury assessment provided by the statistical based approach and to the injury assessment provided by the simulation based approach for outputting a combined injury assessment.

14. The system of claim 12 wherein the injury assessment processing module is remote from the vehicle, and wherein the electronic control unit wirelessly communicates with the injury assessment processing module to provide vehicle dynamic data, the safety restraint data, and the occupant data.

15. The system of claim 12 wherein the injury assessment processing module is disposed within the vehicle, and wherein the electronic control unit communicates with the injury assessment processing module to provide vehicle dynamic data, the safety restraint data, and the occupant data.

16. The system of claim 12 wherein the input device receives inputs from a user to enter physical characteristics of a respective occupant seated in the vehicle, wherein the entered physical characteristics relating to the respective occupant are stored in a memory for future retrieval by the injury assessment processing module.

17. The system of claim 14 wherein the input device receives an identifier relating to an identification of an occupant seated in the vehicle, wherein the identifier is provided to the injury assessment processing module, wherein the injury assessment processing module associates the identifier with stored physical characteristic data of the occupant.

18. The system of claim 12 further comprising an occupant detection system for obtaining occupant data relating to physical characteristics of an unidentified occupant seated in a respective vehicle seat.

19. The system of claim 12 wherein the injury assessment processing module utilizes a statistical based approach, wherein the statistical based approach generates a statistical assessment of each occupant of the vehicle using historical crash data in cooperation with the obtained vehicle dynamic data, safety restraint data, and occupant data.

20. The system of claim 12 wherein an injury assessment processing module utilizes a simulation based approach, wherein the simulation based approach predicts the potential injury assessment of each occupant in the vehicle by simulating the crash utilizing the vehicle dynamic data, safety restraint data, and occupant data.

21. The system of claim 12 wherein the simulation based approach is a simulation-matching approach, wherein the simulation matching approach utilizes previous simulations to predict the potential injury assessment of each occupant of the vehicle.

22. An automated injury assessment prediction system for a crash event comprising:
- a plurality of sensors for obtaining vehicle dynamic data and safety restraint data relating to a crash event;
- an electronic control unit for receiving the vehicle dynamic data and the safety related data from the plurality of sensors;
- an injury assessment processing module in communication with the electrical control unit, the injury assessment processing module predicting a potential injury assessment for each occupant of the vehicle as a result of the crash event;
- an input device for inputting occupant data to the injury assessment processing module, the occupant data relating to physical characteristics of each occupant seated in the vehicle; and
- a communication device for notifying a medical response unit of the crash event and for broadcasting the predicted potential injuries of each occupant to a medical response unit;
- wherein the injury assessment processing module predicts the potential injuries of each occupant based on the vehicle dynamic data, the safety restraint data, and the occupant data of each occupant in the vehicle.

* * * * *